(12) United States Patent
Grinnall et al.

(10) Patent No.: US 7,393,495 B2
(45) Date of Patent: Jul. 1, 2008

(54) METHODS AND APPARATUSES FOR THE FORMATION OF BLOW MOLDED OBJECTS

(75) Inventors: Michael L. Grinnall, Clinton, IA (US); Alan W. Knapper, McCausland, IA (US)

(73) Assignee: Custom-Pak Inc., Clinton, IA (US)

( * ) Notice: Subject to any disclaimer, the term of this patent is extended or adjusted under 35 U.S.C. 154(b) by 87 days.

(21) Appl. No.: 10/995,662

(22) Filed: Nov. 23, 2004

(65) Prior Publication Data

US 2005/0112224 A1   May 26, 2005

Related U.S. Application Data

(60) Provisional application No. 60/525,077, filed on Nov. 25, 2003.

(51) Int. Cl.
*B29C 49/54* (2006.01)
(52) U.S. Cl. .................. 264/534; 425/525
(58) Field of Classification Search ............... 428/35.7, 428/99, 100; 264/531, 534; 425/522, 525
See application file for complete search history.

(56) References Cited

U.S. PATENT DOCUMENTS

| | | | |
|---|---|---|---|
| 4,304,810 A | 12/1981 | Gates et al. | 428/218 |
| RE31,086 E * | 11/1982 | Johnson et al. | 220/840 |
| 4,378,328 A | 3/1983 | Przytulla et al. | 264/534 |
| 5,012,944 A * | 5/1991 | Scheurenbrand et al. | 220/677 |
| 5,035,604 A * | 7/1991 | Rathman et al. | 425/525 |
| 5,200,252 A | 4/1993 | Kelman | 428/159 |
| 5,344,596 A | 9/1994 | Hendry | 264/40.3 |
| 5,433,910 A | 7/1995 | Mukai et al. | 264/255 |
| 5,993,723 A | 11/1999 | Tanaka et al. | 264/500 |
| 6,325,962 B1 * | 12/2001 | Kmiecik et al. | 264/523 |
| 6,435,856 B1 | 8/2002 | Zellers et al. | 425/525 |
| 6,454,984 B1 | 9/2002 | Saito et al. | 264/261 |
| 6,500,379 B1 * | 12/2002 | Wrobbel | 264/515 |
| 2005/0084648 A1 * | 4/2005 | Olsen et al. | 428/100 |

FOREIGN PATENT DOCUMENTS

| | | | |
|---|---|---|---|
| FR | 2771961 A | * | 6/1999 |
| JP | 63242723 A | * | 10/1988 |
| JP | 01034721 A | * | 2/1989 |
| JP | 09314647 A | * | 12/1997 |

* cited by examiner

*Primary Examiner*—Robert B Davis
(74) *Attorney, Agent, or Firm*—St. Onge Steward Johnston & Reens LLC

(57) ABSTRACT

Methods and apparatuses for creating blow-molded components are disclosed. More particularly, the present invention concerns methods and apparatuses for creating double-wall blow-molded components with one or more protuberances not abutting a parting line of a mold. Generally, the protuberances are created by a method comprising the steps of blowing blow-molding material against a molding surface with a cavity of a predetermined shape, so that the blow-molding material enters the cavity at a first end, and urging the blow-molding back toward the first end of the cavity by moving a piston of a predetermined shape. The invention also concerns apparatuses to employ such methods, and the resulting blow-molded objects.

12 Claims, 3 Drawing Sheets

METHODS AND APPARATUSES FOR THE FORMATION OF BLOW MOLDED OBJECTS

RELATED APPLICATIONS

This patent application claims the benefit of, under Title 35, United States Code, Section 119(e), U.S. Provisional Patent Application No. 60/525,077, filed Nov. 25, 2003.

FIELD OF THE INVENTION

The present invention relates to blow-molded components and to methods and apparatuses for creating blow-molded components. More particularly, the invention relates to double-wall blow-molded components with one or more protuberances not abutting the parting line and to methods and apparatuses for creating the same.

BACKGROUND OF THE INVENTION

The use of blow molding as a method for manufacturing various sorts of articles is generally well known. Typically, this process involves the use of a mold consisting of two separate halves or portions having cavities of particularly desired shapes and sizes. Usually, one extrudes a large-diameter, sealed tube of molten material (commonly referred to as a "parison") places the tube between the mold halves, and closes the mold around the tube. The mold halves are closed around the tube at what is referred to as the "parting line." Fluid pressure is then introduced into the tube, forcing the molten tube against the walls of the cavities, conforming the tube to the shape thereof. The pressure is maintained until the molten material cools and solidifies. The pressure is then released, the mold halves are pulled apart, and the hardened article is ejected therefrom.

It is well known to form various protuberances on blow-molded parts. Examples include hinge receptacles, handles, tabs to accept mounting screws, and snap bosses for joining blow-molded components. Certain prior art forms these protuberances by pushing and compressing the molten material of the blow mold parison during the mold close portion of the molding cycle. The pushing and compressing is accomplished by the closing of the two mold halves. It is therefore always in a plane generally perpendicular to the parting line of the mold, although incidental lateral transfer sometimes occurs when a shaping wedge of angled leading surface is part of one or both halves of the mold.

In particular, the use of integrally formed, permanent interference snap bosses is well known as an assembly method to join molded or fabricated plastic components into a finished article. This technique eliminates the need for additional attachment pieces, thereby saving time and materials cost in the assembly process. It also avoids the need for adhesives, which increase costs and potentially introduce appearance problems through smearing or misapplication of the adhesive. Blow-molded double-wall components lend themselves to this attachment method in that they are somewhat resilient, which facilitates assembly, and yet rigid by reason of the structural qualities of the double wall.

One disadvantage of current methods for creating snap bosses and other protuberances is that the blow molding process tends to limit the designer's freedom in placing the protuberance. Generally speaking, snap bosses need to be rigid (have a heavy wall) and deep (to cause significant interference) to provide permanent attachment if the attached components are subjected to even moderately heavy usage. Other protuberances also must be rigid and deep in order to serve their purposes and withstand use. To meet both of these requirements it has been necessary to locate snap bosses and other protuberances at a parting line of the double wall article of which they are a part, in particular a parting line with flash adjacent to it. When the molten material is blown into a narrow cavity along a parting line to form a protuberance, excess air is able to escape at a parting line, allowing the material to enter the appendage and be blown tightly against the wall. However, attempts to locate protuberances away from a parting line by similar methods result in thin-walled, shallow protuberances, because without the air escape provided at a parting line, the material is unable to fully extend into narrow cavities, and is not blown tightly against the walls of the mold. Also, there is sometimes insufficient flash to create a sufficiently rigid protuberance.

There are occasions when it is either not desirable or not possible to work with a design incorporating a snap boss or other protuberance at a parting line. Further, there are other instances where the amount of material available from normal "layflat" in the snap boss or other protuberance area is insufficient to achieve the necessary rigidity and depth.

Certain proposed techniques provide a blow-molding apparatus with an inwardly projecting hollow boss away from a parting line by retracting a piston extended through the mold into the parison during the blowing process. One disadvantage of such techniques is that it is unclear how they could be used to make a protruding boss away from the parting line, as opposed to an inwardly projecting hollow boss. A second disadvantage is that the resulting inward projection has a thinner wall than the rest of the blow-molded apparatus, as these techniques essentially stretch the wall of the apparatus to a greater distance without adding additional material. When forming the protuberance, however, it is desired that it have a sufficiently thick wall, that is, be sufficiently rigid. As explained, this is particularly important when the protuberance is a snap boss intended to permanently affix two blow-molded components.

Other proposed techniques form protruding bosses with an injection method through the use of a piston. Material is injected into the mold, and a piston is compressed while the material is still molten in order to force extra material to form a boss with a greater density than the rest of the component. Although these techniques can successfully form strong protuberances, injecting material into molds results in solid components. Although the protuberance itself might be solid, the purpose of blow molding is to form hollow components, and therefore techniques suited for injection methods are not suited for blow molding. The problem discussed above with respect to blow molding, whereby material is unable to form a protuberance away from a parting line because there is no air escape, does not arise with solid components. Aside from the fact that molds for use with injection methods do not necessarily have parting lines, narrow cavities can simply be filled by injecting more material into the mold. Therefore, these techniques are not suited to creating blow-molded components with protuberances away from the parting line, where blowing additional material will not solve the problems caused by the lack of an air escape or lack of sufficient flash.

What is desired, therefore, is a method and apparatus that facilitates the creation of double-wall blow-molded components with one or more protuberances that are sufficiently rigid and deep, but not abutting a parting line of the mold.

SUMMARY OF THE INVENTION

It is therefore an object of the present invention to provide a method and apparatus that facilitates the creation of double-wall blow-molded components with one or more protuberances.

It is a further object of the present invention to provide a method and apparatus having the above characteristics and which facilitates the creation of protuberances that are sufficiently rigid and deep.

It is another object of the present invention to provide a method and apparatus having the above characteristics and which facilitates the creation of protuberances that are not abutting a parting line of the mold.

These and other objects of the present invention are achieved according to one embodiment of the present invention by provision of an apparatus for creating a blow-molded object with a protuberance which includes a mold having a molding surface against which blow-molding material is blown. The molding surface has a cavity therein, the cavity receiving at least some of the blow-molding material and having a first end and a second end. A piston is disposed within the cavity toward the second end of the cavity in a retracted position and is moveable toward the first end of the cavity in an extended position. When during molding the piston is in the retracted position, at least some of the blow-molding material is urged from the first end of the cavity toward the second end of the cavity, and when the piston is moved to the extended position, at least some of the blow-molding material is urged back toward the first end of the cavity.

In some embodiments, the mold comprises a first portion and a second portion configured to be coupled along a parting line, and the piston is configured to move parallel to the parting line. In some embodiments, the piston has a surface configured to mold at least some of the blow-molding material in a predetermined fashion. In some embodiments, the cavity is configured to form a protuberance in a shape of a boss. In some embodiments, the cavity is configured to form a protuberance in a shape of a tab. In certain embodiments, the cavity is configured to form a protuberance in a shape of a hinge receptacle. In other embodiments, the cavity is configured to form a protuberance in a shape of a handle. In still other embodiments, the cavity is configured to form a protuberance in a shape of a tab to accept at least one screw. In certain embodiments, the blow-molded object is a double-wall blow-molded object.

According to another embodiment of the present invention, a method for creating a blow-molded object with a protuberance includes the steps of: (i) providing a mold having a molding surface against which blow-molding material is adapted to be blown, the molding surface having a cavity therein, the cavity receiving at least some of the blow-molding material and having a first end and a second end; (ii) disposing a piston toward the second end of the cavity; (iii) blowing at least some of the blow-molding material against the molding surface while the piston is in a retracted position toward the second end of the cavity, such that at least some of the blow-molding material is urged from the first end of the cavity toward the second end of the cavity; and (iv) moving the piston toward the first end of the cavity to an extended position, and urging at least some of the blow-molding material back toward the first end of the cavity.

In some embodiments, the piston has a surface configured to mold at least some of the blow-molding material in a predetermined fashion. In some embodiments, upon moving the piston to the extended position, excess material is urged into a void between walls of the double-wall blow-molded object. In some embodiments, the step of urging at least some of the blow-molding material back toward the first end of the cavity forms the protuberance.

In accordance with a further embodiment of the present invention, a blow-molded apparatus includes a first blow-molded object having a parting line, the first blow-molded object having a protuberance located in a position away from the parting line and a second blow-molded object having a cavity. The protuberance is sized and shaped to fit in the cavity, and couple the first blow-molded object and the second blow-molded object to form the blow-molded apparatus.

In accordance with still another embodiment of the present invention, a blow-molded object includes a molded surface corresponding to a blow-molding surface of a mold and a protuberance protruding from the molded surface, the protuberance having an outer surface partially corresponding to the surface of a cavity in the blow-molding surface of the mold and partially corresponding to a face of a piston disposed at an end of the cavity.

In some embodiments, the molded surface has a parting line, and the protuberance is located away from the parting line. In some embodiments, the protuberance is configured to couple to the blow-molded object to a second blow-molded object. In some embodiments, the face of the piston is configured to mold the outer surface of the protuberance in a predetermined fashion. In certain embodiments, the piston is configured to form a protuberance in a shape of a boss. In other embodiments, the piston is configured to form a protuberance in a shape of a tab. In some embodiments, the piston is configured to form a protuberance in a shape of a hinge receptacle. In certain embodiments, the piston is configured to form a protuberance in a shape of a handle. In other embodiments, the piston is configured to form a protuberance in a shape of a tab to accept at least one screw.

In some embodiments, the protuberance is hollow, and a wall of the protuberance is more rigid than another wall of the blow-molded object. In some embodiments, the protuberance is solid, and the protuberance is more rigid than a wall of the blow-molded object. In some embodiments, the blow-molded object is a double-wall blow-molded object.

The invention and its particular features and advantages will become more apparent from the following detailed description considered with reference to the accompanying drawings.

DETAILED DESCRIPTION OF CERTAIN ADVANTAGEOUS EMBODIMENTS

Figure 1B:
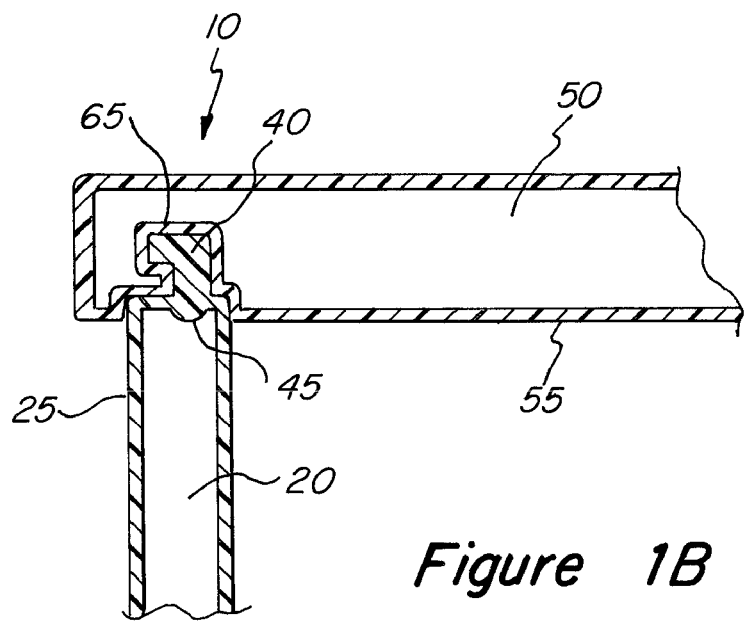
FIG. 1B is a partially cross-sectional view of the object with a protuberance of FIG. 1A shown in conjunction with a mating object.
Figure 1A:
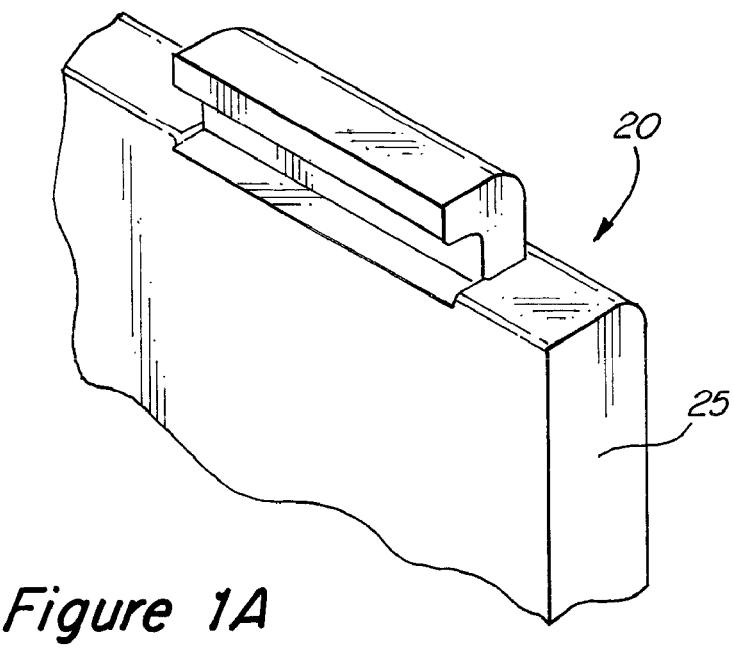
FIG. 1A is an isometric view of a double-wall blow-molded object with a protuberance in accordance with certain embodiments of the present invention.

Referring first to FIGS. 1A and 1B, a double-wall blow-molded apparatus 10 with a protuberance 40 in accordance with certain embodiments of the present invention is illustrated. The double-wall blow-molded apparatus 10 is comprised of a first double-wall blow-molded object 20 with a wall 25 and a second double-wall blow-molded object 50 with a wall 55. Both of the double-wall blow-molded objects are formed by blowing thermoplastic material against the molding surface of a mold. In certain embodiments, the thermoplastic material is a molten parison.

The first blow-molded object 20 has a protuberance 40 formed as part thereof. Apparatuses and methods for forming the protuberance 40 in accordance with certain embodiments of the present invention will be described below. In certain embodiments, the protuberance 40 is located so that it does not abut a parting line. The parting line and location of the protuberance 40 will be discussed in more detail below. Excess material 45, if there is any, is on the inside of the first blow-molded object 20.

In certain embodiments, the protuberance 40 is a boss designed to fit into a cavity 65 in the second blow-molded object 50 in order to couple the two blow-molded objects 20 and 50 in order-to form the blow-molded apparatus 10. For example, in certain embodiments the protuberance is what is referred to as a "snap boss," and the cavity is what is referred to as a "snap-receiving trough." In certain of these embodiments, the protuberance 40 is placed in a rectangular opening adjacent to the cavity 65, and then slid parallel to the parting line, such that the protuberance 40 slides into the cavity 65 and locks into place. When the protuberance 40 is made sufficiently strong, such an arrangement is able to withstand severe abuse, and will not come apart without destroying the protuberance 40. In other embodiments not depicted in the Figures, protuberance 40 is a tab, a hinge receptacle, a tab to accept a mounting screw, or another appendage or protuberance. If protuberance 40 is a tab to accept a screw, for example, it is possible that a second blow-molded component will have a similar tab, and the two components could be attached by inserting a screw or similar attachment in the two tabs.

Figure 2:
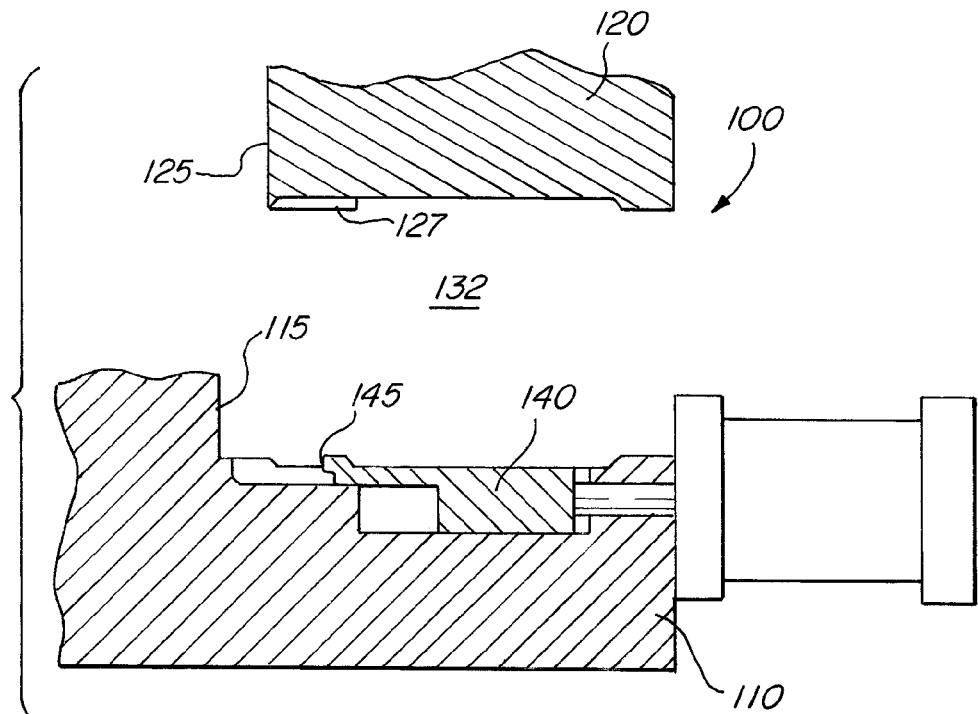
FIG. 2 is a partially cross-sectional view of an apparatus for creating the blow-molded object with a protuberance of FIG. 1A shown in a mold-open position.

With reference now to FIG. 2, an apparatus 100 for creating a blow-molded object with a protuberance in accordance with certain embodiments of the present invention is illustrated. The mold has two parts 110 and 120, which are shown as being separated in FIG. 2. Mold part 110 has a molding surface 115, and mold part 120 has a molding surface 125. The molding surfaces will be described in more detail below. When the apparatus is used, the parison is placed in the cavity 132 between the two mold parts 110 and 120, and the mold parts 110 and 120 are closed around the parison. The mold parts 110 and 120 abut one another at a parting line (not shown in FIG. 2).

The apparatus 100 of FIG. 2 also has a piston 140 with a piston end 145. The piston end 145 is configured so that it will shape the molten material in a predetermined fashion to form the desired protuberance. As oriented in FIG. 2, the piston is configured so that it can be moved from right to left, and thereby urge parison material in that direction. The operation and positioning of the piston will be explained in greater detail below. In certain embodiments, piston end 145 is configured so that the protuberance will be shaped like a boss, a tab, a hinge receptacle, a handle, or a tab to accept a mounting screw. In other embodiments the piston end 145 is configured so that the protuberance has a different shape. The piston 140 is also of a predetermined shape, and is not necessarily cylindrical. In certain embodiments the piston 140 is configured so as to move parallel to a parting line (not shown).

Preferably, a mold feature 127 is provided in the molding surface 125 of mold part 120 in the vicinity of the piston 140 (when the mold is closed). The purpose of mold feature 127 is to force substantially all of the available flash into cavity 180 as the mold closes, then to assist in forcing this flash into cavity 132 via piston 140 during subsequent movement thereof (as described in more detail below). If standard pinch-off techniques were employed rather then employing mold feature 127, a significant amount of material would likely be lost during mold close and then extension of the piston 140. Moreover, the pinch-off created by such techniques would likely break off from the high pressure created during extension of piston 140. These phenomena may lead to a protuberance having less strength than in the preferred embodiment, or even one where the protuberance is not completely formed.

Figure 3:
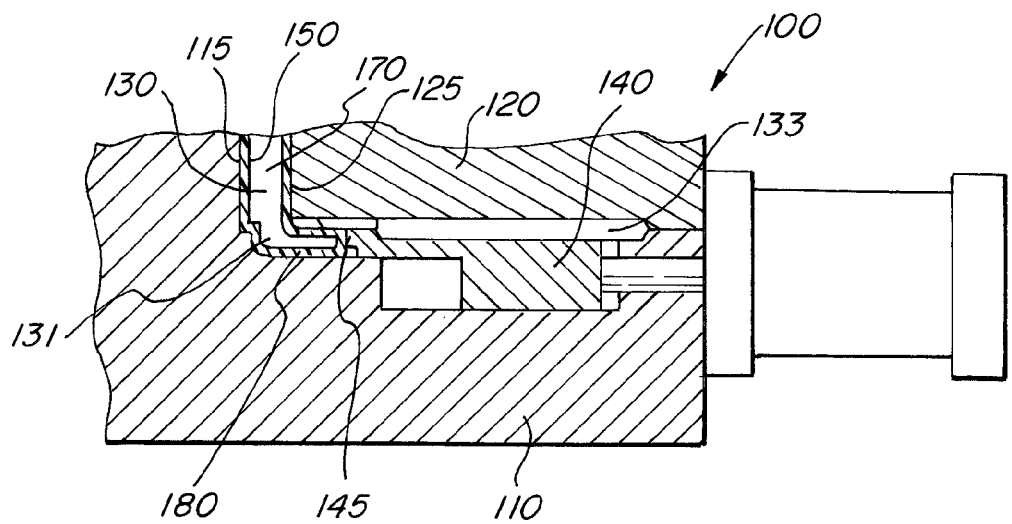
FIG. 3 is a partially cross-sectional view of the apparatus of FIG. 2 at a time subsequent to closing the mold but prior to actuating the piston in accordance with certain embodiments of the present invention.

Referring now to FIG. 3, the apparatus 100 for creating a blow-molded object with a protuberance is shown at a time subsequent to closing the mold parts 110. 120 but prior to actuating the piston 140. For convenience, when possible the same numbering scheme is used for elements in FIG. 3 which are analogous to elements in FIG. 2; however, this is not intended to limit the elements depicted in FIG. 3 to be those depicted in FIG. 2. The two mold parts 110 and 120 are adjoined at a parting line and define a molding surface. The parison material, at least a portion 150 of which is shown in FIG. 3, is blown into the cavity 130 (now having a more distinctive shape than cavity 132 shown in FIG. 2) in the molding surface. The cavity 130 has a first end 131 through which it receives a portion 180 of the blow-molding material, and a second end 133. The portion 150 of the blow-molding material is blown against the mold walls 115 and 125 of the mold parts 110 and 120, respectively, in order to form a blow molded object with a hollow portion 170.

The piston 140 with shaped piston end 145 is disposed toward the second end 133 of the cavity 130. The piston is in a retracted position, whereby the parison material is urged from the first end 131 of the cavity 130 toward the second end 133 of the cavity 130 by the blow-molding process. In the embodiment depicted in FIG. 2, the piston 140 is to be inside the cavity 130, but in other embodiments the piston 140 may be disposed at the second end 133 of the cavity 130, but partially or entirely outside of the cavity 130. In certain embodiments, the blow-molding process includes blowing a fluid into the mold in order to blow the parison material against the sides 115 and 125 of the mold parts 110 and 120. In certain embodiments the fluid is a liquid, while in other embodiments the fluid is a gas, such as air.

Figure 4:
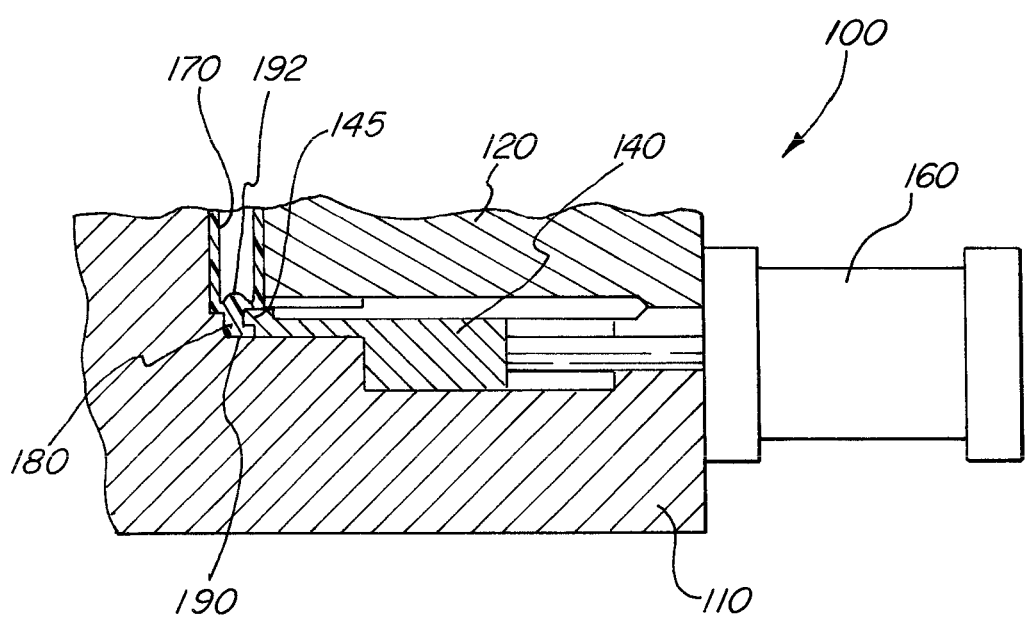
FIG. 4 is a partially cross-sectional view of the apparatus of FIGS. 2 and 3 at a time subsequent to closing the mold and subsequent to actuating the piston in accordance with certain embodiments of the present invention.

With reference now to FIG. 4, apparatus 100 for creating a blow-molded object with a protuberance is shown at a time subsequent to closing the mold parts 110, 120 and subsequent to actuating the piston 140. For convenience, when possible the same numbering scheme is used for elements in FIG. 4 which are analogous to elements in FIGS. 2 and 3; however, this is not intended to limit the elements depicted in FIG. 4 to be those depicted in FIGS. 2 and 3. In FIG. 4 the piston 140 has been moved from the retracted position (toward second end 133 of cavity 130) to an extended position (toward first end 131 of cavity 130), thereby urging potion 180 of the parison material back toward the first end 131 of the cavity 130, and forming the protuberance 190. Piston 140 is moved by an actuator 160, such as a motor or the like.

The cavity 130 and the piston 140 with the piston end 145 are configured in a predetermined fashion so that the resulting protuberance 190 is shaped as desired in a predetermined fashion. Thus, the protuberance 190 has an outer surface of predetermined shape partially corresponding to the surface of the cavity 130 and partially corresponding to the face of the piston 140. In certain embodiments, including the embodiments depicted in FIG. 4, the protuberance 190 is solid, and is more rigid than a wall of the blow-molded object 170. In other embodiments, the protuberance 190 is hollow, but has walls more rigid than another wall of the blow-molded object 170. When the piston 140 is moved to the extended position, if there is any excess material 192, it is urged to the inside of the blow-molded object 170.

Although the invention has been described with reference to a particular arrangement of parts, features and the like, these are not intended to exhaust all possible arrangements or features, and indeed many other modifications, combinations, and variations will be ascertainable to those of ordinary skill in the art.

What is claimed is:

1. An apparatus for creating a blow-molded object with a protuberance, comprising:
   a mold having a molding surface against which blow-molding material is blown, the molding surface having a cavity therein, the cavity receiving at least some of the blow-molding material and having a first end and a second end;
   a piston disposed within the cavity and toward the second end of the cavity in a retracted position and moveable toward the first end of the cavity in an extended position;
   wherein, when during molding said piston is in the retracted position, at least some of the blow-molding material is urged from the first end of the cavity toward the second end of the cavity, and when said piston is moved to the extended position, at least some of the blow-molding material is urged back toward the first end of the cavity; and
   wherein, when said piston is moved to the extended position, excess material is urged into a void between walls of the blow-molded object.

2. The apparatus of claim 1, wherein said piston is configured to move parallel to the parting line.

3. The apparatus of claim 1, wherein said piston has a surface configured to mold at least some of the blow-molding material in a predetermined fashion.

4. The apparatus of claim 3, wherein the cavity is configured to form a protuberance in a shape of a boss.

5. The apparatus of claim 3, wherein the cavity is configured to form a protuberance in a shape of a tab.

6. The apparatus of claim 3, wherein the cavity is configured to form a protuberance in a shape of a hinge receptacle.

7. The apparatus of claim 3, wherein the cavity is configured to form a protuberance in a shape of a handle.

8. The apparatus of claim 3, wherein the cavity is configured to form a protuberance in a shape of a tab to accept at least one screw.

9. The apparatus of claim 1, wherein the apparatus is capable of creating a double wall blow-molded object.

10. A method for creating a blow-molded object with a protuberance, said method comprising the steps of:
    providing a mold having a molding surface against which blow-molding material is adapted to be blown, the molding surface having a cavity therein, the cavity receiving at least some of the blow-molding material and having a first end and a second end;
    disposing a piston toward the second end of the cavity;
    blowing at least some of the blow-molding material against the molding surface while the piston is in a retracted position toward the second end of the cavity, such that at least some of the blow-molding material is urged from the first end of the cavity toward the second end of the cavity;
    moving the piston toward the first end of the cavity to an extended position, and urging at least some of the blow-molding material back toward the first end of the cavity; and
    wherein, upon moving the piston to the extended position, excess material is urged into a void between walls of the blow-molded object.

11. The method of claim 10, wherein the piston has a surface configured to mold at least some of the blow-molding material in a predetermined fashion.

12. The method of claim 10, wherein said step of urging at least some of the blow-molding material back toward the first end of the cavity forms the protuberance.

* * * * *